United States Patent
Talley et al.

(10) Patent No.: US 8,804,670 B1
(45) Date of Patent: Aug. 12, 2014

(54) METHOD AND SYSTEM FOR MANAGEMENT OF INTER-FREQUENCY HANDOFF

(75) Inventors: Ryan S. Talley, Overland Park, KS (US); Muralidhar Malreddy, Overland Park, KS (US); Rajveen Narendran, Olathe, KS (US); Shilpa Kowdley Srivinas, Brambleton, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 732 days.

(21) Appl. No.: 13/029,610

(22) Filed: Feb. 17, 2011

(51) Int. Cl.
*H04W 4/00* (2009.01)

(52) U.S. Cl.
USPC ............................................ 370/332; 370/331

(58) Field of Classification Search
None
See application file for complete search history.

(56) References Cited

U.S. PATENT DOCUMENTS

| | | | |
|---|---|---|---|
| 4,996,715 A | 2/1991 | Marui et al. | |
| 5,634,191 A | 5/1997 | Beasley | |
| 5,767,778 A | 6/1998 | Stone et al. | |
| 5,832,365 A | 11/1998 | Chen et al. | |
| 5,937,332 A | 8/1999 | Karabinis | |
| 6,125,279 A | 9/2000 | Hyziak et al. | |
| 6,141,531 A | 10/2000 | Williams et al. | |
| 6,167,240 A | 12/2000 | Carlsson et al. | |
| 6,219,540 B1 | 4/2001 | Besharat et al. | |
| 6,292,471 B1 | 9/2001 | Cao et al. | |
| 6,404,775 B1 | 6/2002 | Leslie et al. | |
| 6,456,652 B1 | 9/2002 | Kim et al. | |
| 6,493,537 B1 | 12/2002 | Ogawa | |
| 6,507,740 B2 | 1/2003 | Shi | |
| 6,711,408 B1 * | 3/2004 | Raith | 455/440 |
| 6,718,180 B1 | 4/2004 | Lundh et al. | |
| 6,993,338 B2 * | 1/2006 | Lee et al. | 455/442 |
| 7,088,959 B2 | 8/2006 | Ho et al. | |
| 7,280,510 B2 | 10/2007 | Lohtia et al. | |
| 7,346,018 B2 | 3/2008 | Holtzman et al. | |
| 7,626,966 B1 | 12/2009 | Ruiter et al. | |
| 7,787,899 B1 | 8/2010 | Talley et al. | |
| 7,813,323 B1 | 10/2010 | Talley et al. | |
| 7,848,238 B1 | 12/2010 | Pawar et al. | |
| 7,881,263 B1 * | 2/2011 | Vargantwar et al. | 370/331 |
| 2002/0068534 A1 | 6/2002 | Ue et al. | |
| 2002/0107020 A1 * | 8/2002 | Lee | 455/436 |
| 2003/0119460 A1 | 6/2003 | Zipper | |
| 2003/0171132 A1 | 9/2003 | Ho et al. | |
| 2004/0110525 A1 | 6/2004 | Black et al. | |

(Continued)

OTHER PUBLICATIONS

Wan Choi, et al., "Automatic On-Off Switching repeater for DS/CDMA Reverse Link Capacity Improvement," IEEE Communications Letters, vol. 5, No. 4, Apr. 2001, pp. 138-141.

(Continued)

*Primary Examiner* — Kibrom T Hailu

(57) ABSTRACT

Disclosed is a method and corresponding system to help improve inter-frequency handoff. While a radio access network (RAN) is serving one or more devices, the RAN will receive from the device(s) one or more reports of air interface quality on each of a plurality of potential target frequency channels. Dynamically based on the reported air interface quality information, the RAN will then select a given one of the potential target frequency channels to be a preferred target frequency channel. When a given device is fading from coverage, the RAN will then direct the device to scan for coverage on the preferred target frequency channel that was selected based on the earlier reported measures of air interface quality, so as to facilitate inter-frequency handoff.

20 Claims, 5 Drawing Sheets

(56) References Cited

U.S. PATENT DOCUMENTS

| | | | |
|---|---|---|---|
| 2004/0204097 A1 | 10/2004 | Scheinert et al. | |
| 2005/0094616 A1 | 5/2005 | Sakakura | |
| 2005/0143118 A1 | 6/2005 | Bernhardsson et al. | |
| 2005/0148368 A1 | 7/2005 | Scheinert et al. | |
| 2006/0223444 A1 | 10/2006 | Gross et al. | |
| 2006/0291439 A1* | 12/2006 | Yang et al. | 370/338 |
| 2007/0042799 A1 | 2/2007 | Jubin et al. | |
| 2007/0054670 A1 | 3/2007 | Kalika et al. | |
| 2007/0094941 A1 | 5/2007 | Mintie et al. | |
| 2007/0123258 A1* | 5/2007 | Sawyer | 455/436 |
| 2007/0165593 A1 | 7/2007 | Hundal et al. | |
| 2008/0188265 A1 | 8/2008 | Carter et al. | |
| 2008/0244148 A1 | 10/2008 | Nix, Jr. et al. | |
| 2008/0305784 A1 | 12/2008 | Dillinger et al. | |
| 2008/0305801 A1 | 12/2008 | Burgess et al. | |
| 2008/0305835 A1 | 12/2008 | Johnstone et al. | |
| 2009/0005043 A1 | 1/2009 | Claussen et al. | |
| 2009/0069033 A1 | 3/2009 | Karstens et al. | |
| 2009/0104912 A1 | 4/2009 | Foster et al. | |
| 2009/0111499 A1 | 4/2009 | Bosch et al. | |
| 2009/0135754 A1 | 5/2009 | Yavuz et al. | |
| 2009/0274204 A1* | 11/2009 | Chen et al. | 375/228 |
| 2009/0279519 A1 | 11/2009 | Brisebois et al. | |
| 2010/0048212 A1 | 2/2010 | Yavuz et al. | |
| 2010/0056149 A1 | 3/2010 | Jubin et al. | |
| 2010/0056175 A1 | 3/2010 | Bachmann et al. | |
| 2010/0067487 A1* | 3/2010 | Makabe | 370/331 |
| 2010/0178907 A1 | 7/2010 | Oroskar et al. | |
| 2011/0201349 A1* | 8/2011 | Castillo et al. | 455/456.1 |

OTHER PUBLICATIONS

U.S. Appl. No. 12/129,425, filed May 29, 2008.
Office Action from U.S. Appl. No. 12/129,425, dated Jul. 8, 2011.

\* cited by examiner

METHOD AND SYSTEM FOR MANAGEMENT OF INTER-FREQUENCY HANDOFF

BACKGROUND

In a typical cellular wireless communication system, a radio access network (RAN) includes a plurality of base stations that radiate to define coverage areas in which subscriber devices such as cell phones and other wirelessly-equipped devices can operate. In such a system, air interface communications between a base station and a served subscriber device in a given coverage area may occur on a particular frequency channel, such as a defined 1.25 MHz band or pair of bands (e.g., one for forward link communications from the base station to the subscriber device, and another for reverse link communications from the subscriber device to the base station).

When a subscriber device is engaged in a call (e.g., voice call or data session) while being served by a particular base station on a particular frequency channel and the subscriber device starts to lose coverage, it may be beneficial for the subscriber device to hand off to be served by another nearby base station. An issue may arise, however, when nearby base stations do not provide coverage on the same frequency channel as the currently serving base station. In that scenario, the subscriber device may need to engage in an inter-frequency handoff process, in which the call would be transferred from one frequency channel to another.

Overview

To facilitate inter-frequency handoff when a serving base station learns that a served subscriber device is fading from coverage, the base station may signal to the device to direct the device to scan for coverage on a particular target frequency channel. For instance, the base station may transmit over the air to the device a request for the device to scan for pilot signals provided in coverage areas on the target frequency channel and to report back to the base station measures of pilot signal strength. The RAN may then select the best (e.g., strongest reported) coverage area as a target coverage area and may reserve resources in that coverage area to prepare for transfer of the call to that coverage area. Once the handoff is ready to occur, the base station may then signal to the device to direct the device to tune to the target frequency channel and to continue the call in the selected target coverage area on that target frequency channel.

Unfortunately, however, this inter-frequency handoff process may not work well in some scenarios and may in fact result in loss of call connection, i.e., call drop. One reason for this problem may be that the target frequency channel does not provide sufficient coverage to support the call. In practice, for example, the serving base station may be provisioned to direct served devices to a specific target frequency channel merely because an adjacent base station operating on that frequency channel is geographically nearest to the serving base station. However, there may be air interface obstructions or load issues that actually make it difficult or impossible for the device to communicate with that adjacent base station on that target frequency channel. Consequently, when the serving base station directs a device to begin scanning for coverage on that target frequency channel, the device may fail to detect adequate pilot signal strength, or the device may detect and report a pilot but, when the device attempts to continue the call in the chosen target coverage area, the device may be unable to adequately communicate with the target base station.

This type of problem can arise, by way of example (and without limitation), when a subscriber device is being served by a femtocell and is moving out of femtocell coverage and into coverage of a macro network.

Cellular wireless carriers have recently been offering femtocells, e.g., personal base stations, to subscribers to help improve coverage in homes, offices, or other locations where normal, macro network, coverage of the carrier's network may be inadequate. Typically, a femtocell may communicate through a subscriber's broadband Internet connection and connect with a server in the wireless carrier's network, and the femtocell may then function in much the same way that a traditional base station tower (macro base station) operated by the wireless carrier would function. To help minimize interference issues, a carrier may engineer its femtocells to operate on one or more frequency channels set aside for femtocell use. However, this means that when a subscriber device is engaged in a call while being served by a femtocell and the subscriber device begins to leave coverage of the femtocell and move into macro network coverage, the subscriber device may need to engage in an inter-frequency handoff in order to continue the call.

Through engineering design as described above, a femtocell may be provisioned to direct fading subscriber devices to scan for coverage on a particular target frequency channel that is used by one or more geographically nearest macro base stations. For instance, when the femtocell is initially powered on, the femtocell or other network infrastructure may determine a geographic location of the femtocell and may use that location as basis to look up what macro base station is nearest and what frequency channel is used by that macro base station. The femtocell may then automatically become programmed to treat that at least one such frequency channel as a preferred target frequency channel for fading subscriber devices.

When a subscriber device is being served by the femtocell and begins to fade from femtocell coverage, the femtocell may then request the subscriber device to scan for coverage on the preferred target frequency channel and to report the results to the femtocell. In turn, the femtocell or other infrastructure may then select the strongest coverage area reported by the device, and the RAN may reserve resources for the call to continue in that selected coverage area. The femtocell may then direct the device to hand off to that coverage area on the target frequency channel.

In practice, however, the macro base station that is geographically nearest to a femtocell may not actually provide adequate coverage for a subscriber device that is fading from coverage of the femtocell. Further, there may be other reasons why the preferred target frequency channel provisioned in the femtocell is not the best target frequency channel to use for a fading subscriber device. Consequently, this inter-frequency handoff process may not work well and, in a worst case, may result in a call drop as the subscriber device fades from femtocell coverage.

Disclosed herein is a method and corresponding system to help improve inter-frequency handoff. The method is applicable in a femtocell-to-macro network handoff scenario but can also be applied in other inter-frequency handoff scenarios, including but not limited to handoffs from a macro network to a femtocell, handoffs between macro base stations, handoffs between femtocells, and handoffs involving other types of base stations or access points, and with respect to vertical handoffs (i.e., handoffs between different air interface technologies) or horizontal handoffs (i.e., handoffs within a given air interface technology).

In accordance with an implementation of the method, while a RAN is serving one or more devices, the RAN will receive from the device(s) one or more reports of air interface quality on each of a plurality of potential target frequency channels. Dynamically based on the reported air interface quality information, the RAN will then select a given one of the potential target frequency channels to be a preferred target frequency channel. When a given device is fading from coverage, the RAN will then direct the device to scan for coverage on the preferred target frequency channel that was selected based on the earlier reported measures of air interface quality, so as to facilitate handoff.

Advantageously, this implementation provides a dynamic pre-selection (or at least pre-evaluation) of a preferred target frequency channel that a RAN can subsequently direct a fading device to scan for possible handoff. In contrast to the above-discussed arrangement in which a serving base station is provisioned with a target frequency channel based on mere geographic proximity or the like, the method enables selection of a target frequency channel that has been shown through actual device measurements to be a best (e.g., strongest) target frequency channel. When it comes time to direct a fading device to scan a target frequency channel in search of a target coverage area for handoff, the RAN can thus intelligently direct the fading device to scan that dynamically pre-selected target frequency channel.

Optimally, this dynamic pre-selection process can be periodically (or aperiodically) repeated as a background process by the RAN in order to automatically update or confirm the RAN's selection of a preferred target frequency channel based on actual measurements by served devices.

Further, the RAN can correlate air interface quality reports or associated selections of preferred target frequency channel with particular times of day (or days of week, etc.), so as to facilitate time-based selection of a preferred target frequency channel. Use of this process to select a target frequency channel based on time of day may be useful in a scenario where particular frequency channels tend to be heavily loaded at particular times of day while other frequency channels tend to be less loaded at those times of day. Other benefits of may exist as well.

These as well as other aspects, advantages, and alternatives will become more apparent to those of ordinary skill in the art by reading the following detailed description with reference where appropriate to the accompanying description.

DETAILED DESCRIPTION

This description will refer to a "RAN" as the wireless network infrastructure that provides wireless coverage areas in which subscriber devices can operate. Such a RAN will typically include multiple base stations having antenna arrangements and associated equipment that radiate to define the coverage areas at issue and that operate on the frequency channels at issue. Although the description focuses on just a single RAN, it will be readily understood that the principles described herein can be applied as well when multiple different RANs are provided, such as where one RAN currently serves a subscriber device and the subscriber device is fading from coverage of that RAN and may hand off into coverage provided by another RAN.

Furthermore, aspects of the present method can be implemented by a single RAN component, such as a femtocell or other base station, or by a combination of RAN components, such as a femtocell in combination with a femtocell controller, or a base transceiver station in combination with a base station controller.

More generally, it should be understood that present description is set forth by way of example only and that numerous variations are possible. As such, those skilled in the art will appreciate that other arrangements and elements (e.g., machines, interfaces, functions, orders of functions, and groupings) can be used instead, and that some elements may be omitted altogether. Further, many of the elements described herein are functional entities that may be implemented as discrete or distributed components or in conjunction with other components, and in any suitable combination and location. Moreover, various functions described herein as being performed by one or more entities may be carried out by hardware, firmware and/or software. For instance, various functions may be carried out by a processor executing instructions stored in memory.

Figure 1:
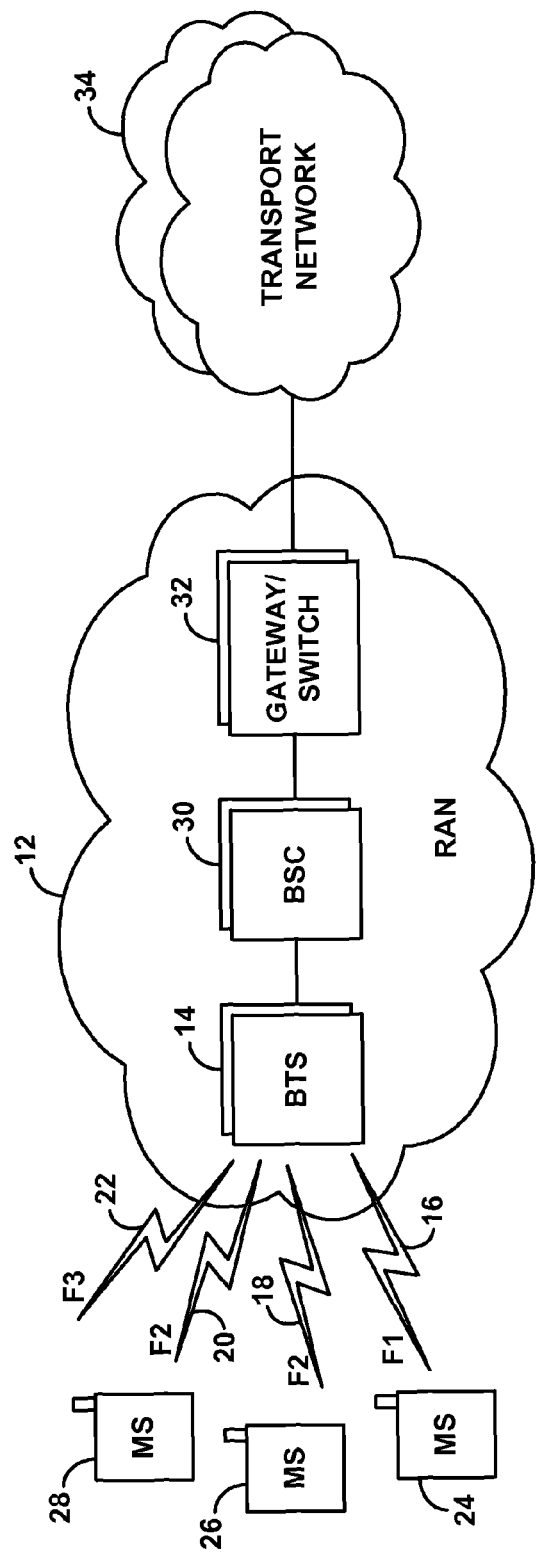
FIG. 1 is a simplified block diagram of a wireless communication system in which the present method can be implemented.

Referring to the drawings, as noted above, FIG. 1 is a simplified block diagram of a wireless communication system in which an exemplary embodiment of the present method can be implemented. As shown in FIG. 1, the system includes at its core a RAN 12 having one or more base transceiver stations (BTSs) 14 that radiate to define a plurality of representative coverage areas 16, 18, 20, 22 in which representative mobile stations 24, 26, 28 can operate. The BTSs and mobile stations may be arranged to communicate with each other over the air in accordance with one or more air interface protocols, such as CDMA, WiMAX, LTE, IDEN, GSM, WIFI, HDSPA, or other protocols now known or later developed.

As shown, the BTSs 14 may be coupled with one or more base station controllers (BSCs) (also known as radio network controllers (RNCs)) 30, which may control various aspects of air interface operation, such as handoffs between BTS coverage areas for instance. (As used herein, the term "base station" may refer to a BTS, a BSC, or a functional combination of BTS and BSC, or to one or more other RAN entities that provide the described functionality.) In turn, the BSCs 30 are then coupled with one or more gateways and/or switches 32 that provide connectivity with one or more transport networks 34. For instance, a representative BSC 30 may be coupled with a packet data serving node (PDSN) that provides connectivity with a packet-switched network such as the Internet and with a mobile switching center (MSC) that provides connectivity with the public switched telephone network (PSTN).

With this arrangement, a mobile station (e.g., cell phone or other wirelessly equipped device) served by the RAN in given coverage area may communicate over the air with a serving BTS and may in turn communicate with other served mobile stations and/or with other entities on one or more transport networks.

As further illustrated in FIG. 1, each coverage area may operate on a particular frequency channel as described above. By way of example, coverage area 16 is shown operating on frequency channel F1, coverage areas 18 and 20 are shown operating on another frequency channel F2, and coverage area 22 is shown operating on yet another frequency channel F3. These frequency channels may each be defined as a particular frequency band or perhaps a pair of frequency bands including one for forward link communications and another for reverse link communications for instance. Other definitions of frequency channels are possible as well, including but not limited to contiguous and non-contiguous frequency bands and other arrangements now known or later developed.

In each coverage area, the air interface protocol may further define various sub-channels for communication on the frequency channel. These sub-channels can be defined through time-division multiplexing, code-division multiplexing, frequency-division multiplexing, and/or some other form of modulation, coding, or the like. By way of example, on the forward link, each coverage area may provide (i) a pilot channel on which the serving BTS broadcasts a pilot signal that identifies the coverage area and that can be measured by a mobile station to facilitate evaluation of coverage, (ii) one or more paging channels on which the BTS transmits page messages to particular mobile stations, (iii) other control channels on which the BTS broadcasts system information, and (iv) numerous traffic channels for carrying bearer data (e.g., voice and/or packet-data) to served mobile stations. Further, on the reverse, link, each coverage area may provide (i) one or more access channels on which mobile stations can transmit call origination messages or the like, as well as (ii) numerous traffic channels for carrying bearer data to the serving BTS. Other examples are possible as well.

When a mobile station enters into (e.g., powers on in) a coverage area when not engaged in a call, the mobile station may scan the air in search of a strongest pilot signal. Upon finding such a pilot signal, the mobile station may then read overhead control channel information to determine what frequency channels are in use in the identified coverage area. If multiple frequency channels are in use, the mobile station may then apply a hashing algorithm to select a frequency channel on which to operate, and the mobile station may then tune to and "idle" on the selected frequency channel (if not already there), awaiting a page message or user directive to originate a call.

To originate a call (e.g., voice call or data session), a mobile station may transmit an origination request message on a reverse link access channel to its serving BTS, and the BTS may pass the request along to the BSC. The BSC may then direct the BTS to assign an air interface traffic channel (e.g., both forward link and reverse link) to the mobile station for use for the call. Further, the BSC may interwork with a switch or gateway to establish a network connection for the call and may then allow the call to proceed.

Similarly, when the RAN seeks to connect a call or otherwise establish bearer communication with an idle mobile station, the RAN may transmit a page message to the mobile station, and the mobile station may then send a page response to the RAN via a reverse link access channel. Upon receipt of the mobile station response, the RAN may then proceed in the manner described above to assign a traffic channel and establish the call connection.

In general, each coverage area of a RAN may have a limited extent of resources that can be allocated for use to support mobile stations calls. For example, each coverage area may have a limited number of traffic channels or a limited amount of bandwidth to schedule or otherwise define traffic channels, and each coverage area may have a limited amount of BTS transmission power that can be used for forward link air interface communications. When a RAN sets up a call for a mobile station in a given coverage area, the RAN may reserve a portion of these resources, such as a traffic channel and transmission power, for use to support the call. If sufficient resources do not exist in the coverage area, however, the RAN may be unable to allow the call to proceed in the coverage area.

In practice, when a mobile station is engaged in a call (e.g., has an assigned traffic channel or other such connection) on a particular frequency channel, the mobile station may regularly monitor pilot signal strength in its serving coverage area and in adjacent coverage areas on the same frequency channel and may from time to time transmit radio-environment reports to the RAN. For instance, the mobile station may determine a signal to noise ratio (e.g., energy to spectral interference, or Ec/Io) for each pilot signal, and the mobile station may transmit to the RAN a pilot strength management message (PSMM) that specifies per coverage area the determined signal to noise ratio.

By evaluating these radio environment reports, it may become clear that a mobile station is fading from its currently serving coverage area, i.e., is losing coverage. This may occur for various reasons, such as the mobile station moving away from the serving base station, the mobile station moving into an obstructed area such as a building, and/or load and consequent noise increasing in the coverage area. When this happens, the RAN and mobile station may work to hand off the call from the current serving coverage area (source coverage area) to a coverage area (target coverage area) in which the mobile station detected sufficiently high pilot signal strength. To achieve this a handoff, the RAN and mobile station may set up a copy of the call in the target coverage area and the mobile station may engage in the call concurrently in both the source coverage area and target coverage area before the RAN and mobile station then tear down the call in the source coverage area.

In FIG. 1, for instance, such a handoff may occur when mobile station 26 is moving from coverage area 18 into coverage area 20. As mobile station 26 begins to fade from coverage area 18 and move into coverage area 20, the radio environment reports that mobile station sends 26 to RAN 12 may indicate that the mobile station is detecting a threshold stronger pilot signal in coverage area 20 than in coverage area 18. RAN 12 may then responsively reserve resources for the call in coverage area 20 and send to the mobile station 26 a handoff direction message (HDM) that directs the mobile station to begin communicating concurrently in coverage area 20. As the signal strength of coverage area 18 becomes threshold low or after confirming successful communication in coverage area 20, the RAN and mobile station may then disconnect the call in coverage area 18, thus completing a full handoff of the call to the coverage area 20.

This "soft" handoff process generally works well in a scenario where the mobile station is able to communicate concurrently in the source and target coverage areas, which is typically the case when the coverage areas operate on the same frequency channel. In a situation where a mobile station begins to fade from coverage on one frequency channel and move into an area on another frequency channel, however, this process may not work, as the mobile station may not have scanned for coverage on that other frequency channel. Such a situation may arise when the mobile station is operating in a "border" coverage area, i.e., a coverage area that is next to one or more coverage areas that do not use the same frequency channel. For instance, in FIG. 1, this may occur when mobile station 24 moves from coverage area 16 to coverage area 18. In that situation, an inter-frequency handoff process may be required.

To facilitate inter-frequency handoff, a RAN may store a record indicating whether a coverage area is a border coverage area such that inter-frequency handoff may be required when a mobile station begins to fade from the coverage area. When the RAN detects the mobile station beginning to fade, the RAN may then send a special directive to the mobile station to cause the mobile station to tune to a particular target frequency channel and to scan for coverage on that target frequency channel.

By way of example, in response to detecting that the mobile station is fading from coverage under a given frequency channel, the RAN may transmit to the fading mobile station a Carrier Frequency Search Request Message (CFSRQM) that specifies the target frequency channel on which the mobile station should scan for target handoff coverage. In response, the mobile station may then tune over to the specified target frequency channel and scan for pilot signals indicative of coverage. In turn, the mobile station may then send a CFSRQM response message to the RAN, providing the RAN with radio environment reports for any detected pilot signals. If any such pilot signal is considered adequate, the RAN may then reserve resources for the call in the associated target coverage area and may then send to the mobile station a universal handoff direction message (UHDM) that directs the mobile station to transition over to the target frequency channel and target coverage area and provides other data necessary for the mobile station to continue the call there.

As noted above, a problem with this process may be that the target frequency channel that the RAN asks the fading mobile station to scan for coverage may not actually be the best choice. Nevertheless, the RAN may be programmed to consider the target frequency channel a preferred target for a given border coverage area on grounds that one or more base stations closest to the currently serving base station operate on that particular frequency channel. As explained above, however, mere geographic proximity of target base stations may not justify a conclusion that coverage provided by the target base stations is likely the best available. There could be a number of reasons why such base stations might not be the best handoff targets. For instance, there could be air interface obstructions that impede communication with such a base station. Or there could be high load and consequent high noise in the coverage areas provide by such a base station.

Figure 2:
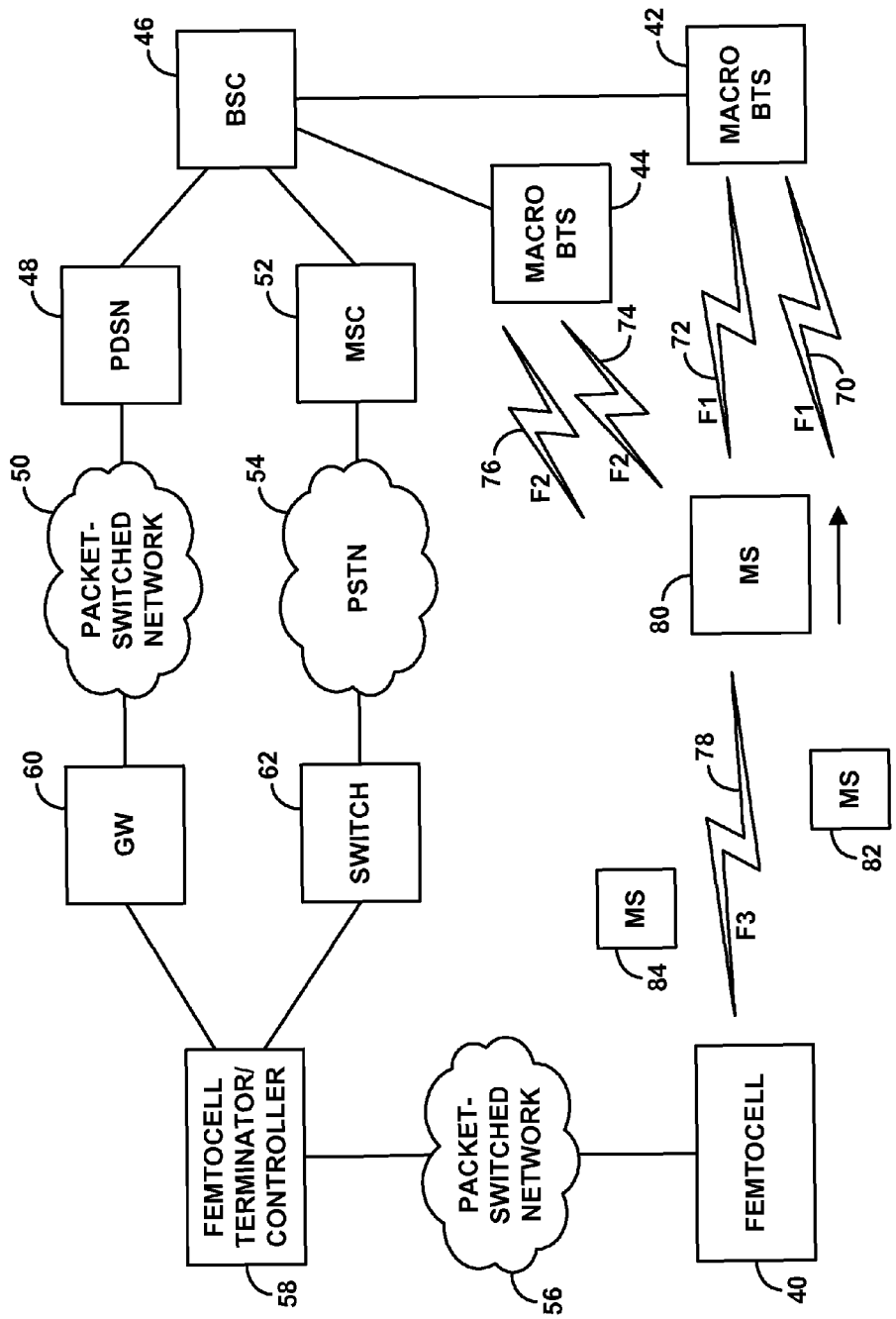
FIG. 2 is a another simplified block diagram of a wireless communication system in which the method can be implemented.

As further noted above, this problem can arise by way of example when a mobile station is served by a femtocell and is fading from femtocell coverage and moving into macro network coverage, and where the femtocell and macro network operate on different frequency channels. FIG. 2 depicts an example arrangement like this.

In particular, FIG. 2 depicts a wireless communication system including a representative femtocell 40 and representative macro network base stations 42, 44. The macro network base stations 42, 44 are coupled with a representative BSC 46, which is in turn coupled with a PDSN 48 that provides connectivity with a packet-switched network 50 and are further coupled with an MSC 52 that provides connectivity with the PSTN 54. The femtocell 40, which may sit in a subscriber's home or office for instance may include or be coupled with a broadband router that connects with a packet-switched network 56 such as the Internet, so that the femtocell 40 can establish a secure session with a femtocell controller (e.g., VPN terminator and controller) 58 likely operated by the subscriber's wireless service provider. The femtocell controller 58 may then connect with a gateway 60 that provides connectivity to network 50 and with a switch 62 that provides connectivity with the PSTN 54. With this arrangement, a mobile station may experience similar service and functionality when in coverage of the femtocell as the mobile station would establish when in coverage of a macro network base station.

FIG. 2 depicts the macro network base stations radiating to define various macro network coverage areas 70, 72, 74, 76 that each operate on either frequency channel F1 or frequency channel F2. Further, the figure depicts the femtocell radiating to define a coverage area 78 that operates on a different frequency channel, F3. Although these coverage areas are represented in the figure by lightning bolts with finite length, the coverage provided by each coverage area will more likely fade out over a distance, and coverage areas may overlap with each other to an extent. For instance, femtocell coverage area 78 will likely overlap to some extent with the various illustrated macro network coverage areas.

FIG. 2 further illustrates a representative mobile station 80 moving from femtocell coverage to macro network coverage. In particular, we can assume that mobile station 80 is currently being served by femtocell 40 on frequency channel F3 and is beginning to fade from coverage of the femtocell. Further, the figure illustrates other mobile stations 82, 84 that may from time to time also be served by femtocell 40.

In line with the discussion above, mobile station 80 may regularly provide femtocell 40 with radio environment reports, which may specify the strength (e.g., signal-to-noise ratio) at which the mobile station is receiving a pilot signal from the femtocell. The femtocell may thus detect when the mobile station is fading from femtocell coverage and, upon detecting such fading, may then responsively send a CFSRQM to the mobile station to cause the mobile station to scan for and report target handoff coverage on a specified target frequency channel.

In practice, the femtocell or associated network infrastructure (e.g., the femtocell controller) may be provisioned to specify a particular target frequency channel based on a consideration of base station location. For instance, when the femtocell first registers with the network (e.g., upon installation in a subscriber's home or office), the femtocell may report its GPS location, and the network may then consult a service provider or regulatory database to determine which macro network base station is nearest to the femtocell's location. The femtocell or supporting network may then become provisioned to treat as the target frequency channel the frequency channel used by that nearest base station. As discussed above, however, such a choice may prove to be suboptimal in some instances.

The present method helps to improve inter-frequency handoff by having a RAN dynamically pre-select a target frequency channel to have a mobile station subsequently search when the mobile station is fading in a border coverage area. In practice, the a serving base station such as femtocell 40 may instruct one or more mobile stations (such as mobile station 80, or mobile stations 80, 82, 84) to scan for coverage on various potential target frequency channels (such as frequency channels F1 and F2), and the base station or other RAN infrastructure may then evaluate reports of air interface conditions received in response, to identify a best target frequency channel based on those actual measurements.

The serving base station may use CFSRQM messaging or the like to acquire this inter-frequency air interface condition reports, perhaps directing one mobile station to determine and report air interface conditions on a particular frequency channel, then directing the same or another mobile station to report air interface conditions on another particular frequency channel, and so forth, evaluating various frequency channels repeatedly over time to build up and store data regarding air interface conditions that the served mobile stations report perceiving on those frequency channels.

In practice, for instance, the serving base station may send a CFSRQM to a mobile station shortly after the origination of a call involving the mobile station, perhaps before the mobile station begins to fade from coverage of the base station. The base station may then repeat this for the mobile station and perhaps for other mobile stations, with respect to various potential target frequency channels.

Notice that, although the method may involve use of CFSRQM messaging that is then also used to direct a fading mobile station to scan for target coverage, the method does not merely involve the same use of CFSRQM messaging. Rather, the method may advantageously involve advanced use of CFSRQM messaging to collect real data that can be used for pre-selection of a preferred target frequency channel or that can be used otherwise to facilitate improved selection of a preferred target frequency channel.

Further, as noted above, the RAN may repeat this process in the background, using measurements from one or more served mobile stations, to confirm or revise a latest selection of preferred target frequency channel. And the RAN may also store data that correlates various preferred target frequency channels with time of day, so that the RAN can later use a particular target frequency channel based on a current time of day.

Advantageously, this process can thus allow the RAN to have a more real understanding of what target frequency channel is likely to provide adequate coverage. When the mobile station begins to fade from femtocell coverage, the femtocell can then direct the mobile station to scan that more intelligently selected target frequency channel for coverage in the manner described above for instance, so as to facilitate potentially more successful inter-frequency handoff.

Figure 3:
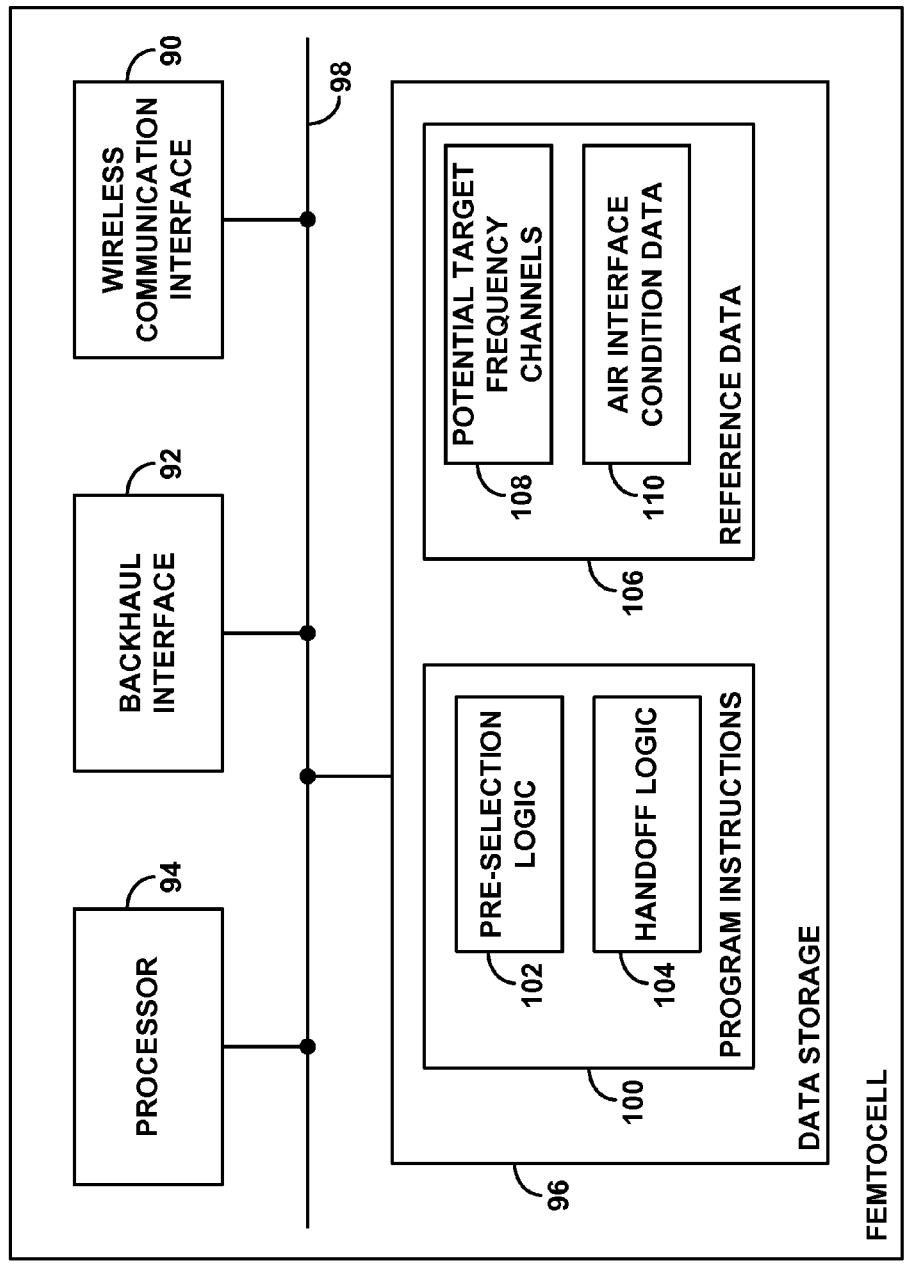
FIG. 3 is a simplified block diagram of a femtocell operable in the method.

FIG. 3 is a simplified block diagram of an example femtocell, showing some of the functional components that can be included in such an entity to facilitate implementation of the present method. As shown, the femtocell includes a wireless communication interface 90, a backhaul interface 92, a processor 94, and data storage 96, all of which may be communicatively linked together by a system bus or other connection mechanism 98.

Wireless communication interface 90 may include an antenna structure and supporting logic (e.g., integrated circuit chipset and power amplifier) for serving mobile stations in much the same way that a traditional base station serves mobile stations. Backhaul interface 92 functions to connect with a network link to facilitate communication with femtocell controller 58, and may therefore take the form of a wired or wireless Ethernet interface for instance.

Processor 94 comprises one or more general purpose processors and/or one or more special purpose processors (e.g., application specific integrated circuits or the like) and may be functionally integrated in whole or in part with wireless communication interface or other femtocell components. Data storage 96, in turn, comprises one or more volatile and/or non-volatile storage components (in either case non-transitory), such as optical, magnetic, flash, or organic storage components, and may be integrated in whole or in part with processor 94.

As shown, data storage 96 includes program instructions 100 executable by processor 94 to carry out various femtocell functions described herein. Alternatively, some of all of these functions could be carried out by other forms of software, firmware, and/or hardware. For instance, as shown, the program instructions 100 may define pre-selection logic 102 and handoff logic 104.

Pre-selection logic 102 is preferably executable by the processor, while the femtocell is serving one or more mobile stations on a particular frequency channel, to dynamically pre-select a preferred second frequency channel to be used as a handoff target. In particular, the dynamic pre-selection may involve (i) the femtocell receiving from the one or more mobile stations reports of air interface quality measured by the one or more mobile stations on second frequency channels and (ii) the femtocell or other associated network infrastructure using the received reports as a basis to select one of the second carrier frequency channels as the preferred second frequency channel.

Handoff logic 104 may then be executable by the processor to detect that a particular one of the one or more mobile stations is fading from coverage on the first frequency channel, and in response to the detecting, (a) to request the particular mobile station to determine and report to the femtocell measurements of sector quality on the dynamically pre-selected second frequency channel, (b) to receive in response from the particular mobile station the requested measurements of sector quality on the dynamically pre-selected second frequency channel, (c) based on the received measurements of sector quality on the dynamically pre-selected second frequency channel, to select a target sector on the dynamically pre-selected second frequency channel, and (d) to direct the particular mobile station to hand off to the selected target sector on the dynamically pre-selected second frequency channel.

Further, data storage 96 includes reference data 106 used in the present method. Reference data 106 is shown including a list of potential target frequency channels 108 and corresponding air interface condition data 110.

The potential target frequency channels 108 may be those frequency channels that are known to be in use by base stations (e.g., macro network base stations) in the vicinity. This data may be downloaded to the femtocell during the process of initial registration of the femtocell with the network, determined based on the femtocell's GPS location for instance, and may be updated from time to time.

The air interface condition data 110 may be rolled-up (e.g., averaged, or strongest) measures of signal strength (e.g., signal-to-noise ratios) reported by mobile stations in coverage areas within each potential target frequency channel. For instance, in the arrangement of FIG. 2, as the femtocell receives mobile station reports of signal strength for coverage areas operating on frequency channel F1, the femtocell may compute a latest average signal strength for coverage areas of frequency channel F1 and may update the air interface condition data 110 accordingly. Likewise, as the femtocell receives mobile station reports of signal strength for coverage areas operating on frequency channel F2, the femtocell may also update the air interface condition data 110 accordingly. A review of air interface condition data 110 may thus reveal which potential target frequency channel is strongest, and based on that fact, the femtocell may select that as the preferred target frequency channel to direct a fading mobile station to scan for coverage.

Further, in line with the discussion above, the air interface condition data 110 may correlate reported air interface conditions with time of day, so as to facilitate time of day based determination of which frequency channel to direct a fading mobile station to scan for coverage. For instance, the air interface condition may specify a target frequency channel to use at a particular time of day (e.g., time of day range) based on reported air interface conditions on that target frequency channel tending to be best (compared with other potential target frequency channels) at that time of day. From another perspective, if the femtocell is arranged to use the earlier received signal strength data as a basis to select a preferred target frequency channel at the time the femtocell detects mobile station fading from femtocell coverage, the femtocell could limit its analysis to be with respect to just the received signal strength data relevant to a time of day similar to the current time of day.

Figure 4:
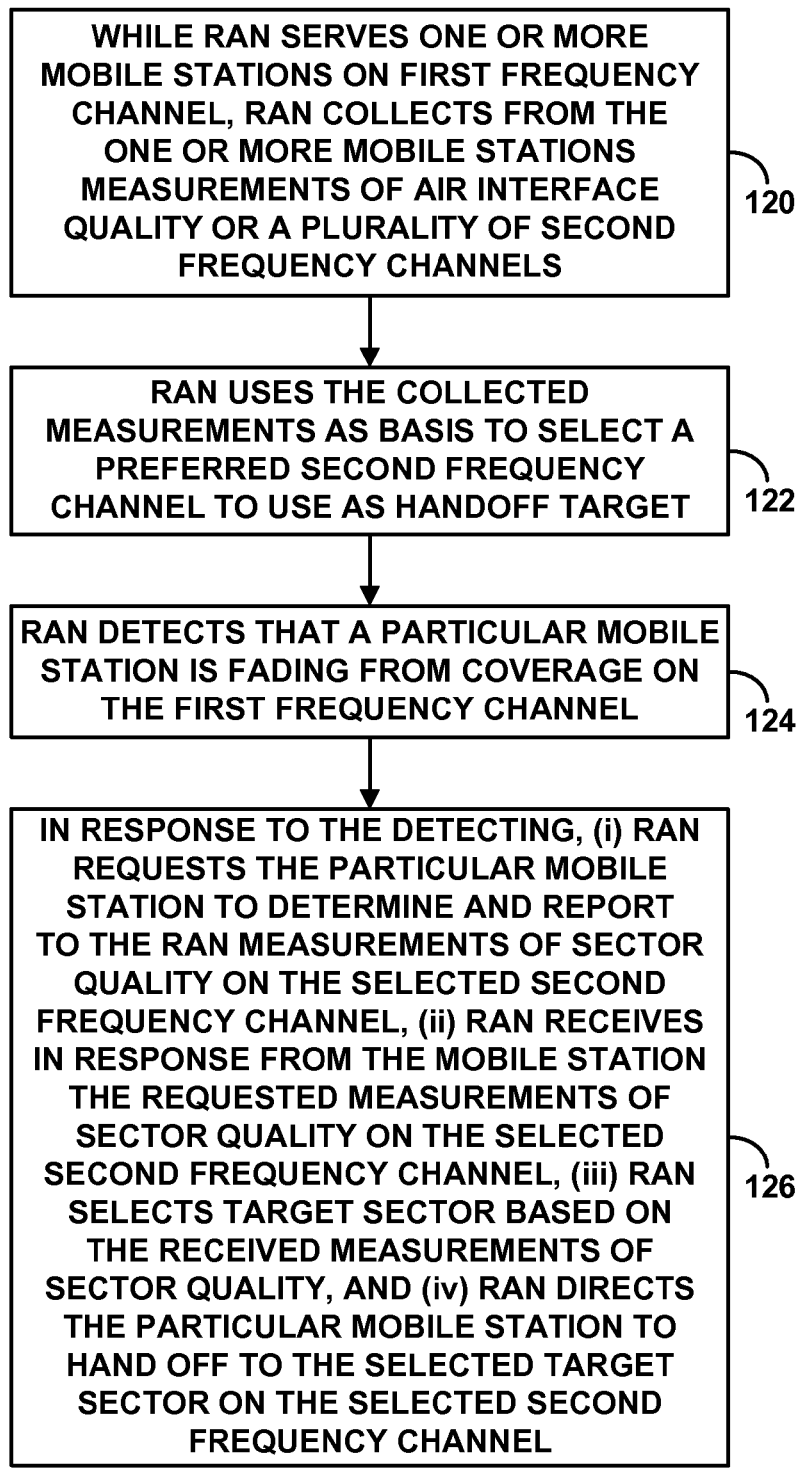
FIG. 4 is a flow chart depicting functions that can be carried out in accordance with the method.

FIG. 4 is next a flow chart depicting functions that can be carried out in accordance with the present method.

As shown in FIG. 4, at block 120, while a RAN is serving one or more mobile stations on a first frequency channel, the RAN collects from the one or more mobile stations measurements of air interface quality of a plurality of second frequency channels, such as by sending CFSRQM messages to the mobile station and receiving responses from the mobile stations for instance.

At block 122, the RAN then uses the collected measurements as a basis to select a preferred second frequency channel to use as a handoff target. For instance, the RAN may roll up or otherwise aggregate the measurements generally or on a time-of-day basis (and/or on one or more other bases, such as GPS location of mobile station for instance), and the RAN may select a frequency channel that has the best reported air interface condition (e.g., the highest average signal-to-noise ratio).

At block 124, the RAN may then detect that a particular mobile station is fading from coverage on the first frequency channel. For instance, while the RAN is serving the mobile station on the first frequency channel, the RAN may receive radio environment reports that show a progressively lower or a threshold low signal strength being detected on the forward link by the mobile station. Alternatively or additionally, the RAN may itself detect threshold low quality of communications being received on the reverse link from the mobile station.

At block 126, in response to detecting that the particular mobile station is fading from coverage on the first frequency channel, the RAN may take several actions. First, the RAN may request the particular mobile station to determine and report to the RAN measurements of sector quality on the selected second frequency channel, such as by sending to the mobile station a CFSRQM specifying the selected second frequency channel. Second, the RAN may receive in response from the mobile station the requested measurements of sector quality on the selected second frequency channel, such as by receiving a CFSRQM response message from the mobile station. Third, the RAN may select a target sector (i.e., coverage area) based on the received measurements of sector quality, such as by selecting a coverage area that the mobile station's CFSRQM reports being the strongest. And fourth, the RAN may then direct the particular mobile station to hand off to the selected target sector on the selected second frequency channel, such as by sending to the mobile station a universal handoff direction message that causes the mobile station to do so.

In practice, the act of collecting measurements of air interface quality of the plurality of second frequency channels preferably occurs before the RAN detects that the particular mobile station is fading. Further, the act of using those collected measurements as a basis to select the preferred second frequency channel also occurs before the RAN detects that the particular mobile station is fading. Thus, the process may involve both pre-evaluation of second frequency channels and pre-selection of a preferred second frequency channel.

Figure 5:
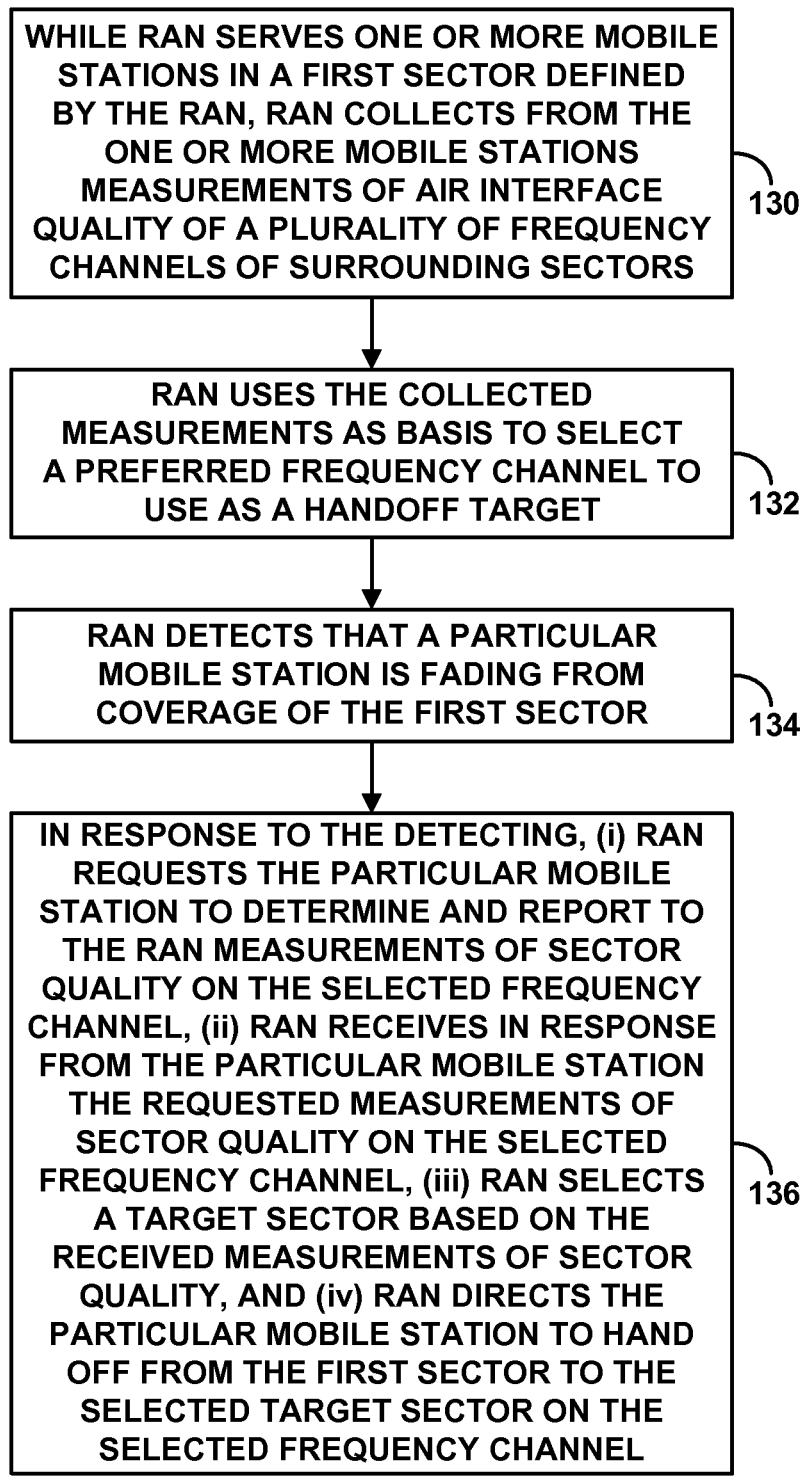
FIG. 5 is another flow chart depicting functions that can be carried out in accordance with the method.

FIG. 5 is next another flow chart depicting functions that can be carried out in accordance with the present method.

As shown in FIG. 5 at block 130, while a RAN is serving one or more mobile stations in a first sector defined by the RAN, the RAN collects from the one or more mobile stations measurements of air interface quality of a plurality of frequency channels of surrounding sectors. At block 132, the RAN then uses the collected measurements as a basis to select a preferred frequency channel to use as a handoff target. At block 134, the RAN detects that a particular mobile station is fading from coverage of the first sector.

And at block 136, the RAN takes certain actions in response to the detecting. In particular, (i) the RAN requests the particular mobile station to determine and report to the RAN measurements of sector quality on the selected frequency channel, (ii) the RAN receives in response from the particular mobile station the requested measurements of sector quality on the selected frequency channel, (iii) the RAN selects a target sector based on the received measurements of sector quality, and (iv) the RAN directs the particular mobile station to hand off from the first sector to the selected target sector on the selected frequency channel.

An exemplary embodiment of the present invention has been described above. Those skilled in the art will appreciate, however, that many variations from the embodiment are possible while remaining within the spirit and scope of the claims.

We claim:

1. A method comprising:
    while a radio access network (RAN) is serving one or more mobile stations on a first frequency channel, the RAN collecting from the one or more mobile stations measurements of air interface quality of a plurality of second frequency channels;
    the RAN using the collected measurements as a basis to select a preferred second frequency channel to use as a handoff target;
    the RAN detecting that a particular mobile station is fading from coverage on the first frequency channel; and
    responsive to the detecting, (i) the RAN requesting the particular mobile station to determine and report to the RAN measurements of sector quality on the selected second frequency channel, (ii) the RAN receiving in response from the particular mobile station the requested measurements of sector quality on the selected second frequency channel, (iii) the RAN selecting a target sector based on the received measurements of sector quality, and (iv) the RAN directing the particular mobile station to hand off to the selected target sector on the selected second frequency channel.

2. The method of claim 1, wherein the collecting of measurements of air interface quality of the plurality of second frequency channels occurs before the detecting that the particular mobile station is fading, and wherein the using of the collected measurements as a basis to select the preferred second frequency channel occurs before the detecting that the particular mobile station is fading.

3. A method comprising:
    a radio access network (RAN) serving one or more mobile stations through air interface communication on a first frequency channel;
    while serving the one or more mobile stations through air interface communication on the first frequency channel, the RAN applying a pre-selection process to dynamically pre-select a preferred second frequency channel to be used as a handoff target, wherein the pre-selection process comprises (i) receiving from the one or more mobile stations reports of air interface quality measured by the one or more mobile stations on second frequency channels and (ii) using the received reports as a basis to select one of the second carrier frequency channels as the preferred second frequency channel; and subsequent to applying the pre-selection process, the RAN detecting that a particular one of the one or more mobile stations is fading from coverage on the first frequency channel, and in response to the detecting, (a) the RAN requesting the particular mobile station to determine and report to the RAN measurements of sector quality on the dynamically pre-selected second frequency channel, (b) the RAN receiving in response from the particular mobile station the requested measurements of sector quality on the dynamically pre-selected second frequency channel, (c) based on the received measurements of sector quality on the dynamically pre-selected second frequency channel, the RAN selecting a target sector on the dynamically pre-selected second frequency channel, and (d) the RAN directing the particular mobile station to hand off to the selected target sector on the dynamically pre-selected second frequency channel.

4. The method of claim 3, carried out by a base station of the RAN.

5. The method of claim 4, wherein the base station is a femtocell, the first frequency channel is a femtocell frequency channel, and the second frequency channels are macro network frequency channels.

6. The method of claim 3, wherein receiving from the one or more mobile stations reports of air interface quality measured by the one or more mobile stations on second frequency channels comprises receiving the reports as responses to one or more Carrier Frequency Search Request Messages (CFSRQMs) that the RAN sends to the one or more mobile stations.

7. The method of claim 6, further comprising the RAN sending the CFSRQMs to the one or more mobile stations while the one or more mobile stations are active and being served by the RAN and not fading from coverage of the first frequency channel.

8. The method of claim 3, wherein using the received reports of air interface quality measured by the one or more mobile stations on the second frequency channels as a basis to select one of the second frequency channels as the preferred second frequency channel comprises:
determining respectively for each particular second frequency channel an aggregate measure of air interface quality based on the received reports of air interface quality measured by the one or more mobile stations on the particular second frequency channel;
selecting as the preferred second frequency channel one of the second frequency channels whose determined aggregate measure of air interface quality is best among the second frequency channels.

9. The method of claim 8, wherein establishing the aggregate measure of air interface quality based on the received reports of air interface quality measured by the one or more mobile stations on the particular second frequency channel comprises averaging measures of air interface quality on the particular frequency channel.

10. The method of claim 3, further comprising the RAN correlating the received reports of air interface quality measured by the one or more mobile stations on the second frequency channels with respective times of day, and wherein using the received reports of air interface quality measured by the one or more mobile stations on the second frequency channels as a basis to select one of the second frequency channels as the preferred second frequency channel comprises:
using a current time of day as a basis to select relevant air interface quality data from the received reports of air interface quality; and
basing the selection of the second frequency channel particularly on the selected relevant air interface quality data.

11. The method of claim 3, wherein detecting that the particular mobile station is fading from coverage on the first frequency channel comprises receiving from the particular mobile station a report of forward link quality on the first frequency channel and determining that the reverse link quality in the received report is threshold low.

12. The method of claim 3, wherein detecting that the particular mobile station is fading from coverage on the first frequency channel comprises detecting that quality of reverse link communication from the particular mobile station is threshold low.

13. The method of claim 3, wherein requesting the particular mobile station to determine and report to the RAN measurements of sector quality on the dynamically pre-selected second frequency channel comprises sending to the particular mobile station a Carrier Frequency Search Request Message (CFSRQM) that specifies the dynamically pre-selected second frequency channel and that requests the particular mobile station to measure and report sector quality on the specified frequency channel.

14. The method of claim 13, wherein receiving in response from the particular mobile station the requested measurements of sector quality on the dynamically pre-selected second frequency channel comprises receiving from the particular mobile station a CFSRQM response that specifies the measurements of sector quality.

15. The method of claim 3, wherein selecting the target sector based on the received measurements of sector quality on the dynamically pre-selected second frequency channel comprises selecting as the target sector a sector having a strongest measurement of sector quality of the received measurements of sector quality.

16. The method of claim 3, wherein directing the particular mobile station to hand off to the selected target sector on the dynamically pre-selected second frequency channel comprises sending to the particular mobile station a universal handoff direction message (UHDM) that specifies at least the second frequency channel, the target sector.

17. The method of claim 3, further comprising:
after selecting the target sector and before directing the particular mobile station to hand off, the RAN reserving resources on the target sector to accommodate handoff of the particular mobile station to the target sector.

18. A radio access network (RAN) comprising:
base stations radiating to provide coverage for served mobile stations on a plurality of frequency channels, wherein a given base station serves one or more mobile stations on at least a first frequency channel;
pre-selection logic executable by the RAN, while the given base station is serving the one or more mobile stations on the first frequency channel, to dynamically pre-select a preferred second frequency channel to be used as a handoff target, by (i) receiving via the given base station, from the one or more mobile stations, reports of air interface quality measured by the one or more mobile stations on second frequency channels and (ii) using the received reports as a basis to select one of the second carrier frequency channels as the preferred second frequency channel; and handoff logic executable by the RAN to detect that a particular one of the one or more mobile stations is fading from coverage on the first frequency channel, and in response to the detecting, (a) to request the particular mobile station to determine and report to the RAN measurements of sector quality on the dynamically pre-selected second frequency channel, (b) to receive in response from the particular mobile station the requested measurements of sector quality on the dynamically pre-selected second frequency channel, (c) based on the received measurements of sector quality on the dynamically pre-selected second frequency channel, to select a target sector on the dynamically pre-selected second frequency channel, and (d) to direct the particular mobile station to hand off to the selected target sector on the dynamically pre-selected second frequency channel.

19. The RAN of claim 18, wherein the given base station is arranged to execute the pre-selection logic and handoff logic.

20. A method comprising:

while a cellular radio access network (RAN) is serving one or more mobile stations in a first sector defined by the RAN, the RAN collecting from the one or more mobile stations measurements of air interface quality of a plurality of frequency channels of surrounding sectors;

the RAN using the collected measurements as a basis to select a preferred frequency channel to use as a handoff target;

the RAN detecting that a particular mobile station is fading from coverage of the first sector; and responsive to the detecting, (i) the RAN requesting the particular mobile station to determine and report to the RAN measurements of sector quality on the selected frequency channel, (ii) the RAN receiving in response from the particular mobile station the requested measurements of sector quality on the selected frequency channel, (iv) the RAN selecting a target sector based on the received measurements of sector quality, and (v) the RAN directing the particular mobile station to hand off from the first sector to the selected target sector on the selected frequency channel.

* * * * *